United States Patent
Dahl et al.

(10) Patent No.: US 9,719,359 B2
(45) Date of Patent: Aug. 1, 2017

(54) WIND TURBINE BLADE COMPRISING RESISTIVE HEATING MEANS

(75) Inventors: Martin Dahl, Flensburg (DE); Bjarne Krab Mortensen, Billund (DK); Benjamin Hornblow, Copenhagen Ø (DK)

(73) Assignee: LM WP PATENT HOLDINGS A/S, Kolding (DK)

( * ) Notice: Subject to any disclaimer, the term of this patent is extended or adjusted under 35 U.S.C. 154(b) by 848 days.

(21) Appl. No.: 14/111,371

(22) PCT Filed: Apr. 11, 2012

(86) PCT No.: PCT/EP2012/056547
§ 371 (c)(1),
(2), (4) Date: Oct. 11, 2013

(87) PCT Pub. No.: WO2012/140058
PCT Pub. Date: Oct. 18, 2012

(65) Prior Publication Data
US 2014/0030093 A1   Jan. 30, 2014

(30) Foreign Application Priority Data

Apr. 11, 2011   (EP) ..................................... 11161903
Apr. 11, 2011   (EP) ..................................... 11161904

(51) Int. Cl.
*F03D 13/10*        (2016.01)
*F01D 5/28*         (2006.01)
(Continued)

(52) U.S. Cl.
CPC .............. *F01D 5/28* (2013.01); *B29C 65/342* (2013.01); *B29C 65/348* (2013.01);
(Continued)

(58) Field of Classification Search
CPC ........ F03D 1/001; F03D 1/0675; F03D 13/10; F03D 80/00
(Continued)

(56) References Cited

U.S. PATENT DOCUMENTS 3,239,403 A * 3/1966 Williams ................ C09J 7/043
                                                156/272.4
3,770,555 A * 11/1973 Gladstone ............. C08G 18/10
                                                156/137

(Continued)

FOREIGN PATENT DOCUMENTS

EP   1 310 351 A1   5/2003
EP   2 033 769 A1   3/2009
(Continued)

*Primary Examiner* — Sean J Younger
(74) *Attorney, Agent, or Firm* — Nath, Goldberg & Meyer; Jerald L. Meyer; Tanya E. Harkins

(57) ABSTRACT

A wind turbine blade 2 comprises a profiled contour including a leading edge 34 and a trailing edge 33 as well as a pressure side and a suction side. The profiled contour is formed by a first shell part 10 and a second shell part 15 being bonded together in a bonding region between the first and the second shell part by a curable bonding means 40. The first and the second shell part 10; 15 are formed in a fiber-reinforced polymer. The wind turbine blade further comprises resistive heating means 50 being arranged in thermal connection with the bonding means 40 such that the resistive heating means 50 supplies heat for curing of the curable bonding means 40 during assembling of the wind turbine blade.

14 Claims, 5 Drawing Sheets

(51) Int. Cl.
*F03D 1/06* (2006.01)
*B29C 65/34* (2006.01)
*B29C 65/36* (2006.01)
*B29C 65/48* (2006.01)
*B29C 65/50* (2006.01)
*B29C 65/56* (2006.01)
*B29C 65/00* (2006.01)
*B29L 31/08* (2006.01)

(52) U.S. Cl.
CPC ...... *B29C 65/3432* (2013.01); *B29C 65/3476* (2013.01); *B29C 65/362* (2013.01); *B29C 65/368* (2013.01); *B29C 65/3632* (2013.01); *B29C 65/3676* (2013.01); *B29C 65/4835* (2013.01); *B29C 65/5057* (2013.01); *B29C 65/5071* (2013.01); *B29C 65/564* (2013.01); *B29C 66/54* (2013.01); *B29C 66/721* (2013.01); *F03D 1/0675* (2013.01); *B29C 66/71* (2013.01); *B29C 66/7212* (2013.01); *B29C 66/7394* (2013.01); *B29L 2031/085* (2013.01); *F05B 2230/23* (2013.01); *F05B 2260/221* (2013.01); *F05B 2280/6003* (2013.01); *F05B 2280/6013* (2013.01); *Y02E 10/721* (2013.01); *Y02P 70/523* (2015.11); *Y10T 29/49336* (2015.01)

(58) Field of Classification Search
USPC .......................................................... 416/95
See application file for complete search history.

(56) References Cited

U.S. PATENT DOCUMENTS

| | | | | |
|---|---|---|---|---|
| 3,964,958 A | * | 6/1976 | Johnston | B29C 33/02 100/211 |
| 4,015,035 A | | 3/1977 | Blad et al. | |
| 4,560,428 A | * | 12/1985 | Sherrick | B29C 35/0272 156/273.9 |
| 4,755,429 A | * | 7/1988 | Nickols | C04B 37/008 156/304.5 |
| 4,768,562 A | * | 9/1988 | Strand | F16L 55/1656 138/98 |
| 5,264,059 A | * | 11/1993 | Jacaruso | B29C 65/342 156/148 |
| 5,304,269 A | * | 4/1994 | Jacaruso | B29C 65/344 156/148 |
| 5,322,580 A | * | 6/1994 | McIntire | B29C 37/0078 156/148 |
| 5,389,184 A | * | 2/1995 | Jacaruso | B29C 65/342 156/273.9 |
| 5,451,351 A | * | 9/1995 | Blackmore | B29C 63/0069 138/97 |
| 5,591,291 A | * | 1/1997 | Blackmore | B29C 35/02 156/156 |
| 5,648,137 A | * | 7/1997 | Blackmore | B29C 35/02 428/102 |
| 5,656,231 A | * | 8/1997 | Blackmore | B29C 35/02 264/258 |
| 5,814,175 A | * | 9/1998 | Rau | B29C 66/71 156/157 |
| 6,146,576 A | * | 11/2000 | Blackmore | B29C 66/496 156/273.9 |
| 6,605,168 B1 | * | 8/2003 | Bleibler | E04G 23/0218 156/273.9 |
| 7,042,109 B2 | * | 5/2006 | Gabrys | F03D 9/002 290/44 |
| 7,628,949 B2 | * | 12/2009 | Blackmore | B28B 11/242 264/333 |

FOREIGN PATENT DOCUMENTS

| | | |
|---|---|---|
| GB | 578485 | 7/1946 |
| GB | 869992 | 6/1961 |
| WO | 01/46582 A2 | 6/2001 |
| WO | 2009/153341 A2 | 12/2009 |

* cited by examiner

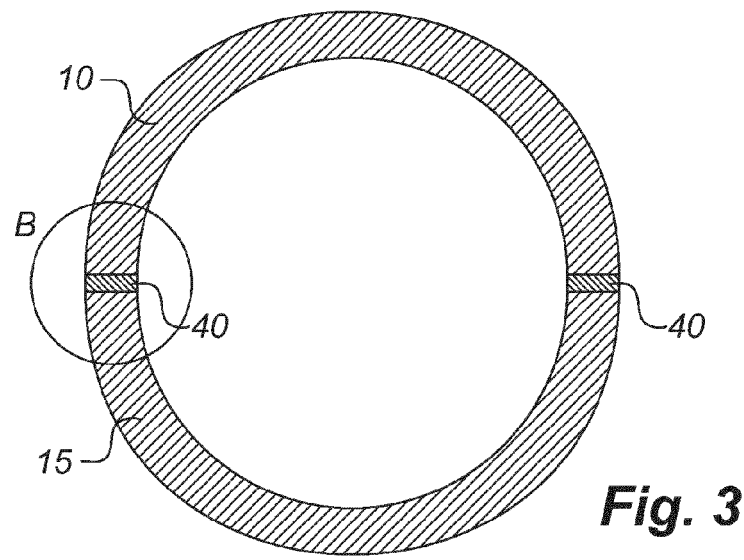
*Fig. 3*
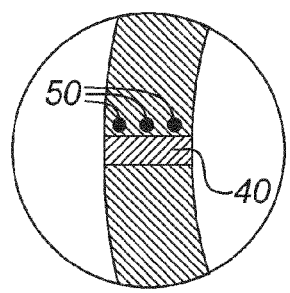 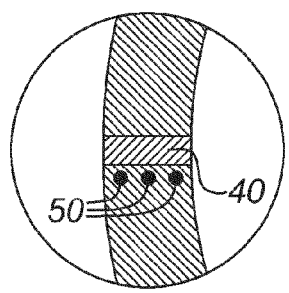 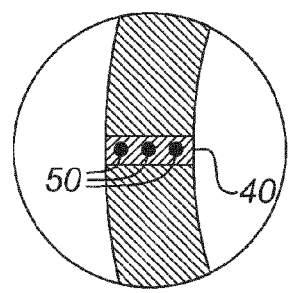
*Fig. 3A*     *Fig. 3B*     *Fig. 3C*
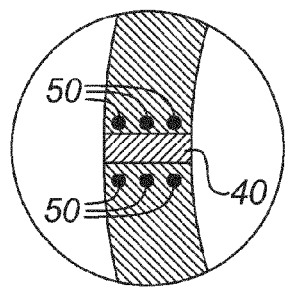 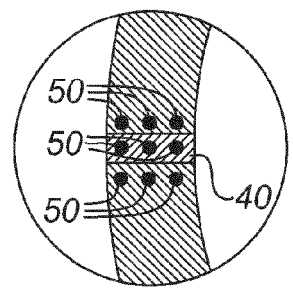
*Fig. 3D*     *Fig. 3E*

WIND TURBINE BLADE COMPRISING RESISTIVE HEATING MEANS

This is a National Phase Application filed under 35 U.S.C. §371 as a national stage of International Application No. PCT/EP2012/056547, filed Apr. 11, 2012, claiming the benefit from European Patent Application No. 11161904.5, filed Apr. 11, 2011, claiming benefit from European Patent Application No. 11161903.7, filed Apr. 11, 2011, the entire content of each of which is hereby incorporated by reference in its entirety.

TECHNICAL FIELD

The present invention relates to a wind turbine blade for a rotor having a substantially horizontal rotor shaft, the rotor comprising a hub from which the wind turbine blade extends substantially in a radial direction when mounted to the hub, the wind turbine blade being made of a fibre-reinforced composite material comprising fibres embedded in a polymer matrix, the wind turbine blade comprising a profiled contour including a leading edge and a trailing edge as well as a pressure side and a suction side, the profiled contour generating a lift when being impacted by an incident airflow, wherein the profiled contour is divided into a root region with a substantially circular profile closest to the hub, an airfoil region with a lift generating profile furthest away from the hub, and optionally a transition region between the root region and the airfoil region, the profile of the transition region changing gradually in the radial direction from the circular profile of the root region to the lift generating profile of the airfoil region, wherein the profiled contour is formed by a first shell part and a second shell part being bonded together in a bonding region between the first and the second shell part by a curable bonding means, the first and the second shell part being formed in a fibre-reinforced polymer. The present invention also relates to a method for manufacturing the wind turbine blade.

BACKGROUND ART

Horizontal axis wind turbines comprise a rotor provided with a number of wind turbine blades—often two or three—which extend radially from a hub. The wind turbine blades have a profile transversely to the longitudinal or radial direction of the wind turbine blades. The wind turbine blades comprise a root region with a substantially circular profile closest to the hub, an airfoil region with a lift generating profile furthest away from the hub, and optionally a transition region between the root region and the airfoil region, the profile of the transition region changing gradually in the radial direction from the circular profile of the root region to the lift generating profile of the airfoil region. The lift generating profile is provided with a suction side and a pressure side as well as a leading edge and a trailing edge. Typically, the wind turbine blades are manufactured by bonding two shell parts together along a bonding region substantially following the leading edge and the trailing edge of the wind turbine blade, such that each of the shell parts represents substantially either the pressure side or the suction side. As the demand for more powerful wind turbines, e.g. longer wind turbine blades, is increasing and the demand for more cost-effective wind turbines is increasing at the same time, problems are encountered to provide blades which have sufficient structural strength and utilise the material in an optimal way. This is especially the case for the bonding region between the two shell parts forming the wind turbine blade.

EP 2 033 769 discloses a method of manufacturing a wind turbine blade, where different longitudinal parts are manufactured separately and later moulded together.

U.S. Pat. No. 4,015,035 discloses a method of forming fiber-reinforced epoxy composite scarf joints with filaments extending from mating surfaces.

EP 1 310 351 discloses a method of manufacturing a wind turbine blade in a one-shot resin infusion process.

WO 01/46582 discloses a rotor blade for a wind power installation which has a plurality of segmented elements. Said segmented elements are attached to a load transmitting box spar and are separated by elastic joints, which enable the segments to move in relation to one another, thus minimising the tensile stress in the region of the rotor blade in which the segments are located.

DISCLOSURE OF THE INVENTION

It is an object of the invention to obtain a new wind turbine blade and a method for manufacturing the wind turbine blade, which overcomes at least one of the disadvantages of the prior art or at least provides a useful alternative.

According to a first aspect of the invention, the wind turbine blade further comprises resistive heating means being arranged in thermal connection with the bonding means such that the resistive heating means supplies heat for curing of the curable bonding means during assembling of the wind turbine blade.

Hereby, a wind turbine blade is provided which has an improved mechanical strength in the bonding region as the resistive heating means supplies heat to the bonding means in a more controlled way and furthermore provides a faster curing of the bonding means, which results in improved mutual bonding of the first and the second shell part. Thus, the blade is also faster to manufacture as the curing time is reduced, which results in a shorter cycle time. The bonding region extends substantially along the leading edge and the trailing edge of the profiled contour and comprises the bonding means and a limited region of the first and the second shell part being in the proximity of the bonding means. The outer surface of the first and second shell part each represents substantially either the pressure side or the suction side of the profiled contour. Preferably, the resistive heating means is arranged such that the resistive heating means covers substantially the entire bonding region thermally, e.g. is able to heat the entire bonding region sufficiently so that the bonding means is curing. The resistive heating means may be present in the entire bonding region, but the resistive heating means may also be provided as point sources placed along the bonding region such that the resistive heating means covers substantially the entire bonding region thermally.

In another embodiment according to the invention, the resistive heating means is embedded in and forms an integral part of the first shell part and is arranged in the proximity of the bonding region.

Hereby, a wind turbine blade is provided which may be assembled using existing bonding means without modification as the resistive heating means is incorporated in the first shell part. Preferably, the resistive heating means is embedded in and forms an integral part of both the first and second shell part in such way that the resistive heating means is arranged in the proximity of the bonding region, thereby ensuring a substantially symmetrical heat supply to the bonding means.

In another embodiment according to the invention, the resistive heating means is embedded in and forms an integral part of the bonding means.

Hereby, a wind turbine blade is provided which may be assembled using the existing shell parts without modification as the resistive heating means is incorporated in the bonding means, thereby providing an internal and direct heating of the bonding means, which ensures faster curing of the bonding means.

In another embodiment according to the invention, the resistive heating means is provided by at least one conductive wire.

Hereby, a wind turbine blade is provided where the resistive heating means is provided easily by at least one conductive wire. The one or more conductive wires may have differing/varying properties, e.g. being made of various materials and/or having varying cross-sectional shapes and/or areas, thereby providing different characteristics. The amount of heat being generated can thereby be regulated in a straightforward way. An example of material for the one or more conductive wires could be a metal, such as steel. Preferably, the one or more conductive wires are arranged so that the one or more conductive wires are substantially parallel with the longitudinal extension of the bonding region.

In another embodiment according to the invention, the bonding means is fibre-reinforced.

Hereby a wind turbine blade is provided where the bonding means is strengthened by being fibre-reinforced. The bonding means further comprises a matrix material that cures when being subjected to heat. The matrix material may be a resin such as polyester or epoxy.

In another embodiment according to the invention, the bonding means comprises curable material and resistive heating means.

Hereby, a bonding means is provided which is self-curing as the bonding means comprises resistive heating means and thus, may be used with conventional shell parts without any resistive heating means.

In another embodiment according to the invention, the resistive heating means is provided by conductive fibres in the fibre-reinforcement.

Hereby, a wind turbine blade is provided where the resistive heating means is part of one or more of the structural elements of the wind turbine blade. Thus besides supplying heat, the resistive heating means also serves as a structural member in the wind turbine blade. The conductive fibres may form a part of the first shell part, the second shell part or the bonding means or any combination thereof. Preferably, the conductive fibres are made of a metal, such as steel, as both high strength and good resistance heating are achieved.

In another embodiment according to the invention, the conductive fibres in the fibre-reinforcement may be metal fibres, such as steel fibres.

Hereby, a wind turbine blade is provided where the resistive heating means is part of one or more of the structural elements of the wind turbine blade. Thus besides supplying heat, the resistive heating means also serves as a structural member in the wind turbine blade. The conductive fibres may form a part of the first shell part, the second shell part or the bonding means or any combination thereof. By using steel as the conductive fibres, a good combination of mechanical strength and electrical resistance for heating is achieved.

In another embodiment according to the invention, the bonding means comprises a flange for bonding to an inner surface of the first and/or second shell part. Hereby, an improved attachment of the bonding means to the first and/or second shell part is obtained.

The object of the invention is also achieved by a method comprising the following steps: a) providing a first and a second shell part, bonding means and resistive heating means, b) arranging the bonding means between the first and the second shell part forming a bonding region, and c) activating the resistive heating means in order to heat the bonding region, so that the bonding means cures and thereby bonds the first and the second shell part together in the bonding region via the bonding means.

Hereby, a method for manufacturing a wind turbine blade is provided, which improves the mechanical strength in the bonding region as the resistive heating means supplies heat to the bonding means in a more controlled way and furthermore provides faster curing of the bonding means, which results in improved bonding of the first and the second shell part. Furthermore, the method is also faster than conventional methods of manufacturing blades as the curing time is reduced, which results in a shorter cycle time. Preferably, the resistive heating means is arranged such that the resistive heating means covers substantially the entire bonding region thermally, e.g. is able to heat the entire bonding region sufficiently so that the bonding means is curing. The resistive heating means may be present in the entire bonding region, but the resistive heating means may also be provided as point sources placed along the bonding region such that the resistive heating means covers substantially the entire bonding region thermally.

In another embodiment according to the invention, the method may further comprise step e) connecting the resistive heating means via wires to a power supply.

The resistive heating means may be connected directly to the power supply via wires or indirectly by the wires from the power supply being connected to the resistive heating means via alligator clips or the like.

In another embodiment according to the invention, the activation of the resistive heating means in step c) is provided by sending an electrical current through the resistive heating means.

Hereby, a method is provided where the amount of heat generated by the resistive heating means is easily adjustable by regulating the electrical current sent through the resistive heating means. The electrical current may be supplied as a constant current or as a current dependent on time, e.g. a high initial current decaying over time as the curing progresses. The electrical current is sent through the resistive heating means by connecting the resistive heating means by wires to a power supply.

In another embodiment according to the invention, the activation of the resistive heating means in step c) is provided by inducing an electrical current in the resistive heating means by use of magnetic means.

Hereby, a method is provided where the amount of heat generated by the resistive heating means is easily adjustable by regulating the induction of the resistive heating means. The electrical current may be supplied as a constant current over time or as a current dependent on time, e.g. a high initial current decaying over time as the curing progresses. By using magnetic means, a method is provided where the magnetic means can move freely and unconnected to the wind turbine blade. Furthermore, the magnetic means may be used on a limited region of the bonding zone where fast curing is critical. This method may also be used in combination with the above-mentioned methods.

According to a second aspect, the invention provides a wind turbine blade for a rotor having a substantially horizontal rotor shaft, the rotor comprising a hub from which the wind turbine blade extends substantially in a radial direction when mounted to the hub, the wind turbine blade comprising a profiled contour including a leading edge and a trailing edge as well as a pressure side and a suction side, the profiled contour generating a lift when being impacted by an incident airflow, wherein the profiled contour is divided into a root region with a substantially circular profile closest to the hub, an airfoil region with a lift generating profile furthest away from the hub, and optionally a transition region between the root region and the airfoil region, the profile of the transition region gradually changing in the radial direction from the circular profile of the root region to the lift generating profile of the airfoil region, wherein the profiled contour is formed by a first shell part and a second shell part being bonded together in a bonding region between the first and the second shell part by a curable bonding means, the first and the second shell part being formed in a fibre-reinforced polymer and each shell part comprising an end surface facing and being bonded to the bonding means. The present invention also relates to a method for manufacturing the wind turbine blade.

The wind turbine blade further comprises a number of filaments extending from the first end surface of the first and/or the second shell part into the bonding means and being bonded to both the bonding means and the respective shell parts from which the filaments extend. It should be noted that the filaments extending from the first end surface of the first and/or the second shell part into the bonding means may be a part of a separate pre-made element, such as a pultruded or extruded element.

Hereby, a wind turbine blade is provided which has an improved mechanical strength in the bonding region as the filaments increase the effective area over which the bonding means and the first or second shell part respectively are bonded together, which results in an overall improved bonding of the first and the second shell part. The bonding region extends substantially along the leading edge and the trailing edge of the profiled contour and comprises the bonding means and a limited region of the first and the second shell part being in the proximity of the bonding means. The outer surface of the first and second shell part substantially represents the pressure side or the suction side of the profiled contour, respectively. Preferably, around 50% of the filaments extend from the first shell part, and the remaining 50% extend from the second shell part, but 60% or 70% or 80% or 90% or even 100% of the filaments could extend from the first shell part and thus the remaining 40% or 30% or 20% or 10 or 0% would extend from the second shell part. Preferably, the filaments are spaced evenly in the bonding region so that even bonding is obtained in the entire bonding region. However, the filaments can also be unevenly spaced, so that e.g. the concentration of filaments (filaments per area unit) is highest in the root region to compensate for the higher mechanical forces that appear in this region and is smallest in the airfoil region. The filaments may form an integral part of the fibre-reinforcement in the first and/or second shell part and/or the filaments may be fastened separately to the first and/or second shell part.

In another embodiment according to the invention, each of the filaments extends substantially perpendicular to the end surface of the respective shell part from which the filaments extend.

Hereby, a wind turbine blade is provided where the filaments may form an integral part of the fibre-reinforcement in the first and/or second shell parts as the fibres are typically arranged substantially perpendicular to the end surface. However, the filaments may also be fastened separately to the first and/or second shell part, and having the filaments extending substantially perpendicular to the end surface makes the process easier and ensures that the filaments can be arranged between two adjacent fibre layers of the fibre-reinforcement in the respective shell part. However, the filaments may also extend obliquely from the end surface of the respective shell part from which the filaments extend.

In another embodiment according to the invention, the filaments are single fibres.

Hereby, a simple solution is provided where e.g. the filaments may form an integral part of the fibre-reinforcement in the first and/or second shell parts as the fibre-reinforcement is typically arranged substantially perpendicular to the first end surface. However, separate single fibres being fastened to the first or second shell surface may also be used.

In another embodiment according to the invention, the filaments are multiple fibre arrangements.

Hereby, a wind turbine blade is provided where the filaments may be specifically de-signed and constructed for the task by applying multiple fibre arrangements, whereby material and physical properties can be optimised, e.g. with regard to mechanical strength and surface area for bonding. The multiple fibre arrangements may be made of a single material or of several materials and may include windings.

In another embodiment according to the invention, the filaments comprise metal, such as steel.

Hereby, high strength filaments are obtained. The filaments may be made either in a pure metal or in an alloy. Alternatively, the filaments are a composite, which comprises additional materials to metal(s). As metal fibre-reinforcement is used increasingly in wind turbine blades, the metal filaments may form an integral part of the fibre-reinforcement of the first and/or second shell part. Alternatively, the metal filaments may be fastened separately to the respective shell part by providing a bore in the respective shell part, the bore having an opening to the end surface, and fastening the metal filament by bonding means such as glue. Alternatively, the metal filaments may be fastened by providing an outer thread on the metal filaments that is engageable with an inner thread in the bore in the respective shell part. Optionally, the filaments may be coated with another metal, e.g. zinc or brass.

In another embodiment according to the invention, the filaments comprise glass. Hereby, the glass filaments may form an integral part of the fibre-reinforcement of the first and/or second shell part. The filaments may be made either in pure glass or may alternatively be a composite, which comprises additional materials to glass.

In another embodiment according to the invention, the filaments comprise carbon. Hereby, high-strength filaments are obtained. The filaments may be made either in pure carbon or alternatively, the filament may be a composite, which comprises additional materials to carbon. As carbon fibre-reinforcement is used increasingly in wind turbine blades, the carbon filaments may form an integral part of the fibre-reinforcement of the first and/or second shell part.

In another embodiment according to the invention, the thickness of the filaments is less than 5 millimeters. Hereby, the filaments are small enough to be considered as fibres and can interact properly and effectively with the bonding means. Dependent on the material and design of the filaments, the filaments may be flexible or rigid enough to carry their own mass. By thickness is meant any characteristic measure, e.g. diameter, of the width of the filaments, which is measured in the transverse direction of the extension of the filaments. The thickness of the filaments is preferably larger than 5 micrometers. The filaments may also comprise metal wires, such as steel wires having a cross-sectional dimension in a range between 0.04 millimeters and 1.0 millimeters, or in a range between 0.07 and 0.75 millimeters, or in a range between 0.1 and 0.5 millimeters. These dimensions have shown to have the best trade-off between optimising the impregnation time and the strength or stiffness of the wind turbine blade during subsequent use of the root section on a wind turbine blade of a wind turbine.

In another embodiment according to the invention, the filaments may be chamfered in the end fastened to the bonding means. Hereby, the filaments may spear through the binding means and thus be embedded in the bonding means. Preferably, the angle of the chamfering is acute and with an interval of 0 to 45 degrees measured at the top angle of the end of the filaments.

In another embodiment according to the invention, the filaments may be distributed substantially evenly along the bonding region. Hereby, a uniform bonding strength is obtained along the entire bonding region. Preferably, around 50% of the filaments are fastened to the first shell part and extend from the end surface thereof, and the remaining 50% are fastened to the second shell part and extend from the end surface thereof, but 60% or 70% or 80% or 90% or even 100% of the filaments could be fastened to the first shell part and thus the remaining 40% or 30% or 20% or 10 or 0% would be fastened to the second shell part. The filaments may also be spaced unevenly, so that e.g. the concentration of filaments (filaments per area unit) is highest in the root region to compensate for the higher mechanical forces that appear in this region and is smallest in the airfoil region.

In another embodiment according to the invention, the bonding means may comprise a curable matrix material. Hereby, the bonding means may comprise a similar matrix material to the first and/or second shell part. The matrix material may be a resin such as polyester or epoxy.

In another embodiment according to the invention, the bonding means may be fibre-reinforced. Hereby, the bonding means may comprise a similar fibre-reinforcement material as the first and/or second shell part. The fibre-reinforcement may comprise steel, glass or carbon or any combination thereof.

In another embodiment according to the invention, the bonding means may comprise a flange bonded to an inner surface of the first and/or second shell part. Hereby, an improved attachment of the bonding means to the first and/or second shell part is obtained.

The second aspect of the invention also provides a method, wherein the method comprises the following steps: a) providing a first and a second shell part and bonding means and a number of filaments extending from the end surface of at least one of the shell parts, b) arranging the bonding means between the first and the second shell part, so as to form a bonding region in which the filaments extend into the bonding means, and c) allowing curing of the bonding means, thereby bonding the first and the second shell part together in the bonding region via the bonding means and the filaments.

Hereby, a method is provided for manufacturing a wind turbine blade, which has an improved mechanical strength in the bonding region as the filaments increase the effective area over which the bonding means and the first or second shell part, respectively, are bonded together, which results in an overall better bonding of the first and the second shell part. The bonding region extends substantially along the leading edge and the trailing edge of the profiled contour and comprises the bonding means and a limited region of the first and the second shell part being in the proximity of the bonding means. Preferably, around 50% of the filaments are fastened to the first shell part and extend from the surface thereof, and the remaining 50% are fastened to the second shell part and extend from the end surface thereof, but 60% or 70% or 80% or 90% or even 100% of the filaments could be fastened to the first shell part and thus the remaining 40% or 30% or 20% or 10 or 0% would be fastened to the second shell part. Preferably, the filaments are spaced evenly in the bonding region so that even bonding is obtained in the entire bonding region. However, the filaments may also be unevenly spaced, so that e.g. the concentration of filaments (filaments per area unit) is highest in the root region to compensate for the higher mechanical forces that appear in this region and is smallest in the airfoil region. The filaments may form an integral part of the fibre-reinforcement in the first and/or second shell part and/or the filaments may be fastened separately to the first and/or second shell part. Preferably, the filaments are fastened to the first and/or second shell part in the manufacturing of the respective shell parts.

The first and second aspect of the invention may be combined in any way.

BRIEF DESCRIPTION OF THE DRAWINGS

The invention is explained in detail below with reference to the drawings, in which FIG. 3 shows a cross-sectional view of a first embodiment of a wind turbine blade according to the invention, FIG. 3A shows part of a cross-sectional view of a second embodiment of a wind turbine blade according to the invention, FIG. 3B shows part of a cross-sectional view of a third embodiment of a wind turbine blade according to the invention, FIG. 3C shows part of a cross-sectional view of a fourth embodiment of a wind turbine blade according to the invention, FIG. 3D shows part of a cross-sectional view of a fifth embodiment of a wind turbine blade according to the invention, FIG. 3E shows part of a cross-sectional view of a sixth embodiment of a wind turbine blade according to the invention.

DETAILED DESCRIPTION OF THE INVENTION

Figure 1:
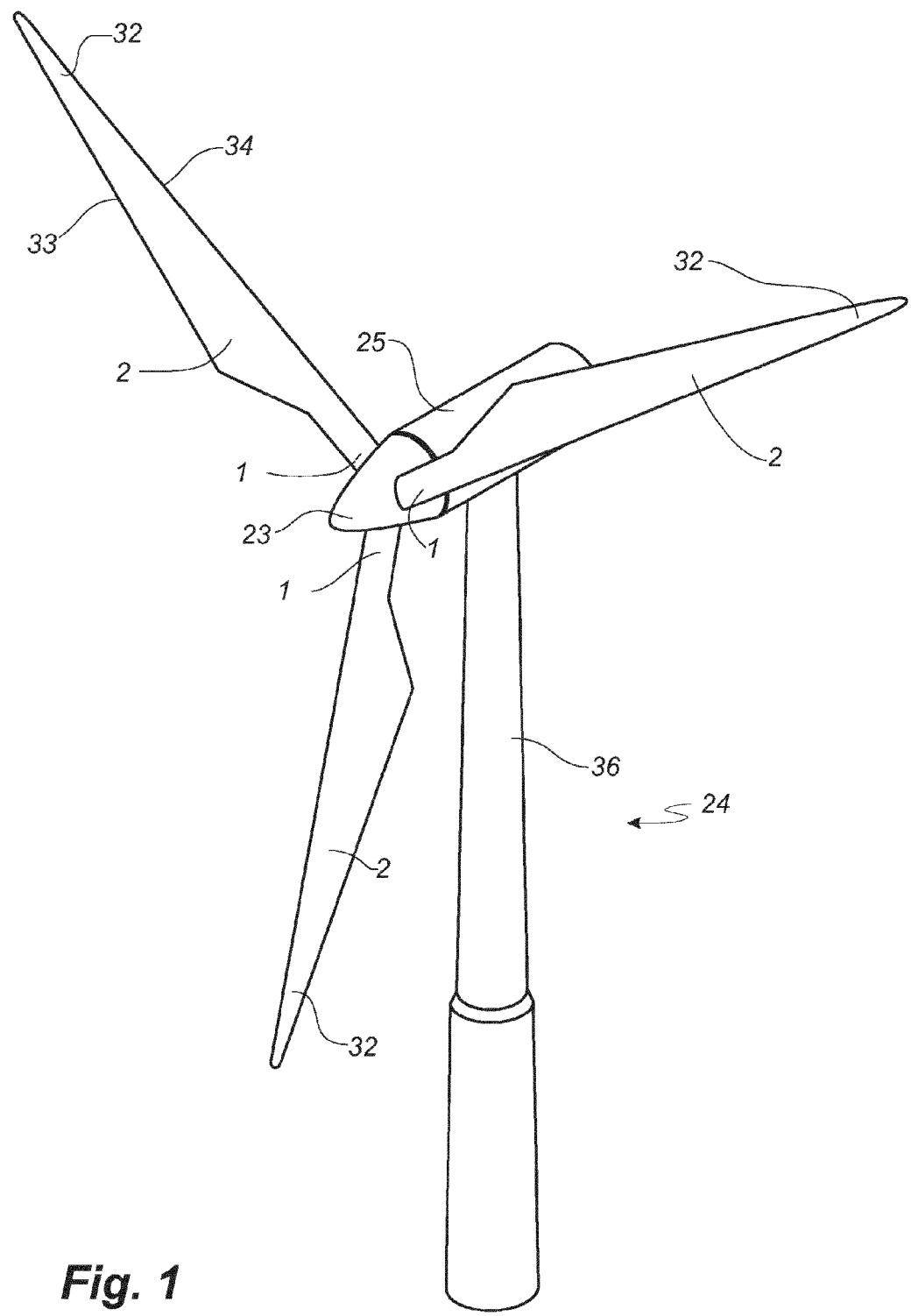
FIG. 1 shows a wind turbine.

FIG. 1 illustrates a conventional, modern upwind wind turbine 24 according to the so-called "Danish concept" with a tower 36, a nacelle 25 and a rotor with a substantially horizontal rotor shaft. The rotor includes a hub 23 and three wind turbine blades 2 extending radially from the hub 23, each having a wind turbine blade root 1 nearest the hub 23 and a wind turbine blade tip 32 furthest from the hub 23.

Figure 2:
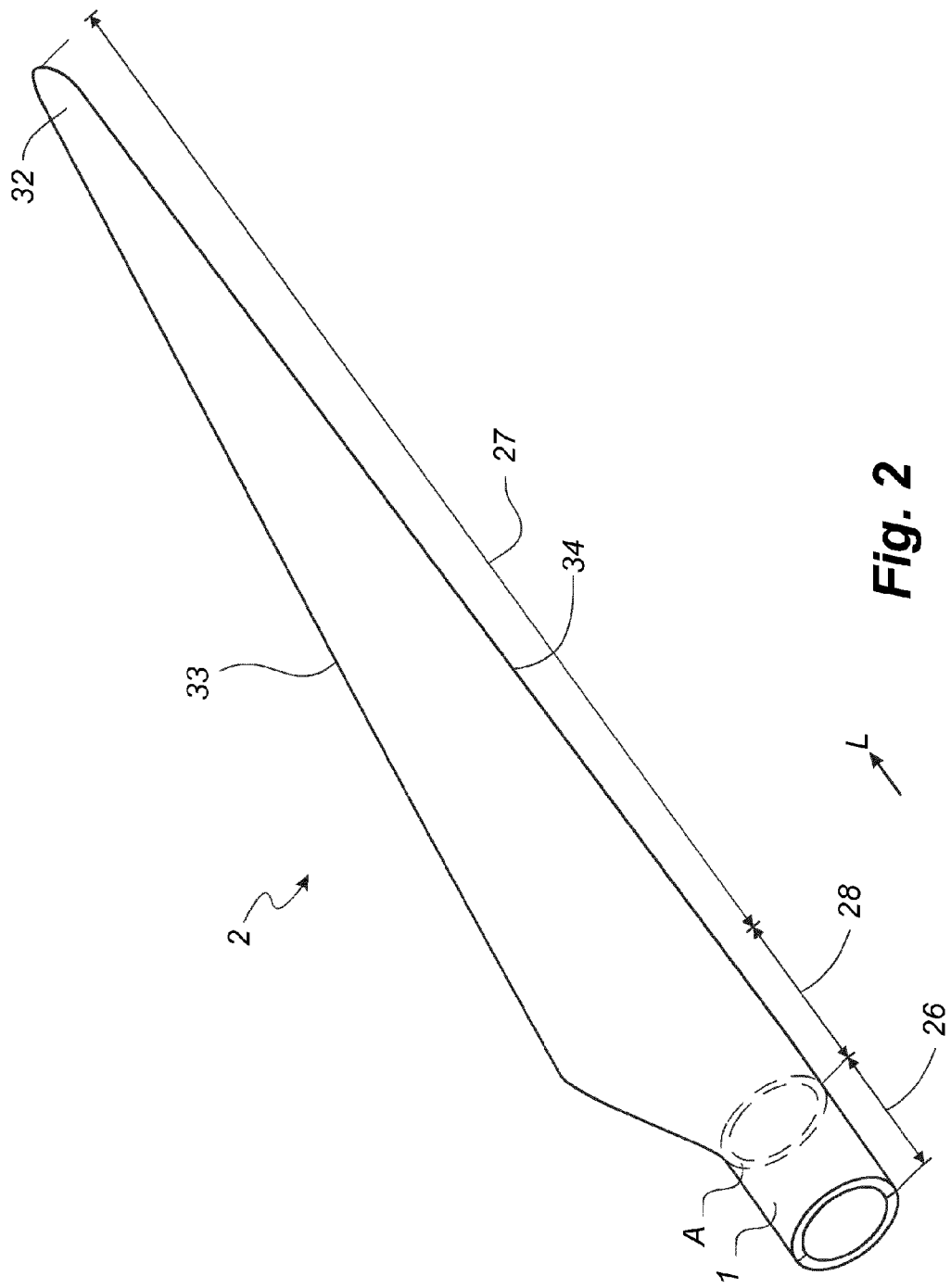
FIG. 2 shows a perspective view of a wind turbine blade of an airfoil type.

As seen from FIG. 2, the wind turbine blade 2 comprises a root region 26 with a substantially circular profile closest to the hub, an airfoil region 27 with a lift generating profile furthest away from the hub, and a transition region 28 between the root region 26 and the airfoil region 27, the profile of the transition region 28 changing gradually in the radial direction from the circular profile of the root region 26 to the lift generating profile of the airfoil region 27. The lift generating profile is provided with a suction side and a pressure side as well as a leading edge 34 and a trailing edge 33. The airfoil region 27 has an ideal or almost ideal blade shape, whereas the root region 26 has a substantially circular cross section. The airfoil region 27 has an airfoil profile with a chord plane extending between the leading edge 34 and the trailing edge 33 of the wind turbine blade 2. It should be noted that the chord plane does not necessarily run straight over its entire extent since the wind turbine blade 2 may be twisted and/or curved, thus providing a chord plane with a correspondingly twisted and/or curved course. The width of the transition region 28 increases substantially linearly with the increasing distance from the hub 23. The wind turbine blade 2 is manufactured by bonding two shell parts together along a bonding region substantially following the leading edge 34 and the trailing edge 33 of the wind turbine blade 2, such that each of the shell parts represents substantially either the pressure side or the suction side. Preferably, the bonding region extends throughout the root region 26, the transition region 28 and the airfoil region 27.

FIGS. 3, 3A, 3B, 3C, 3D and 3E show cross-sectional views of embodiments according to the invention. The shown cross-sectional views are all located in the root region 26 as shown in FIG. 2 as A, but the concept of the invention also applies to any other cross section of the root region 26, transition region 28 and airfoil region 27, but only cross-sectional views of the root region are shown for simplicity. Furthermore, it should be noted that the cross-sectional views have been made for illustrative purpose and thus should not be taken as an exact representation of the embodiments. The cross-sectional views in FIGS. 3A, 3B, 3C, 3D and 3E are all part of cross-sectional views corresponding to the encircled portion B shown in FIG. 3. The resistive heating means 50 could be one or more conductive wires, and examples of material for the resistive heating means 50 could be a metal, such as steel. Preferably, the resistive heating means is arranged along the entire bonding region and is preferably arranged so that the one or more conductive wires are substantially parallel with the longitudinal extension of the bonding region.

FIG. 3 shows a first embodiment according to the invention, where a first shell part 10 and a second shell part 15 are bonded together in a bonding region between the first shell part 10 and the second shell part 15 by a curable bonding means 40. Preferably, the first shell part 10 and the second shell part 15 are formed in a fibre-reinforced polymer. In at least the proximity of the bonding means, the first shell part 10 and/or the second shell part 15 comprises conductive fibres in the fibre reinforcement that functions as resistive heating means. The conductive fibres are not shown in FIG. 3 as they form an integral part of the fibre-reinforcement.

FIGS. 3A and 3B show a second and third embodiment according to the invention, where the resistive heating means 50 is arranged either in the first shell part 10 or in the second shell part 15, but in the proximity of the bonding means 40. The resistive heating means 50 is provided by resistive wires 50. The energy released from the resistive heating means 50 must be sufficiently high to heat the side of the bonding means proximal to the shell part not being provided with a heating means and to reach the opposite side of the bonding means.

FIG. 3C shows a fourth embodiment according to the invention, where the resistive heating means 50 is arranged inside the bonding means 40, preferably substantially at the centre of the bonding means so that a symmetrical heating of the bonding region is obtained.

FIG. 3D shows a fifth embodiment according to the invention, where the resistive heating means 50 is arranged both in the first shell part 10 and in the second shell part 15 and in the proximity of the bonding means 40. The resistive heating means 50 is provided by resistive wires 50. This embodiment also provides a substantially symmetrical heating of the bonding region.

FIG. 3E shows a sixth embodiment according to the invention, which is a combination of the fourth and the fifth embodiment and thus also provides a substantially symmetrical heating of the bonding region.

The examples have been described according to advantageous embodiments. However, the invention is not limited to these embodiments and thus, the number of resistive wires may be altered, and also the thickness of the wires and their internal alignment may be modified without deviating from the scope of the invention.

FIGS. 4, 5, 6 and 7 show cross-sectional views of additional embodiments according to the invention. The shown cross-sectional views are all located in the root region 26 as shown in FIG. 2 as A, but the concept of the invention also applies to any other cross section of the root region 26, transition region 28 and airfoil region 27, but only cross-sectional views of the root region are shown for simplicity. Furthermore, it should be noted that the cross-sectional views have been made for illustrative purpose and thus should not be taken as an exact representation of the embodiments.

In all embodiments, the filaments 60 are preferably small enough to be considered as fibres so that they can interact properly and effectively with the bonding means 40. Dependent on the material and design of the filaments 60, the filaments 60 can be flexible or rigid enough to carry their own mass. Preferably, the thickness of the filaments 60, e.g. diameter, is larger than 5 micrometers. The filaments 60 may comprise steel wires having a cross-sectional dimension in a range between 0.05 millimeters and 1.0 millimeters, or in a range between 0.07 and 0.75 millimeters, or in a range between 0.1 and 0.5 millimeters. The filaments 60 may also be chamfered in the end extending into the bonding means 40 so that the filaments 60 can cut through the bonding means 40 even when the bonding means 40 are fibre-reinforced.

Figure 4:
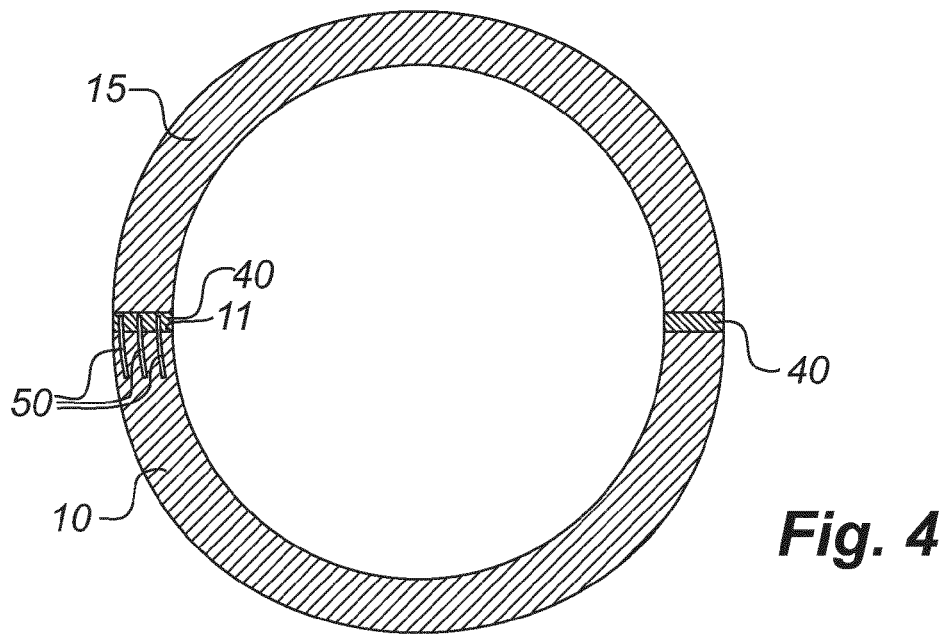
FIG. 4 shows a cross-sectional view of a first additional embodiment of a wind turbine according to the invention.

FIG. 4 shows a first embodiment according to the invention, where a first shell part 10 and a second shell part 15 are bonded together in a bonding region between the first shell part 10 and the second shell part 15 by a curable bonding means 40. Preferably, the first shell part 10 and the second shell part 15 are formed in a fibre-reinforced polymer. The first shell part 10 comprises an end surface 11 facing and bonded to the bonding means 40. The first shell part 10 further comprises a number of filaments 60 extending from the end surface 11 of the first shell part 10 or into the bonding means 40 and being bonded to both the bonding means 40 and the first shell part 10 from which the filaments 60 extend.

Figure 5:
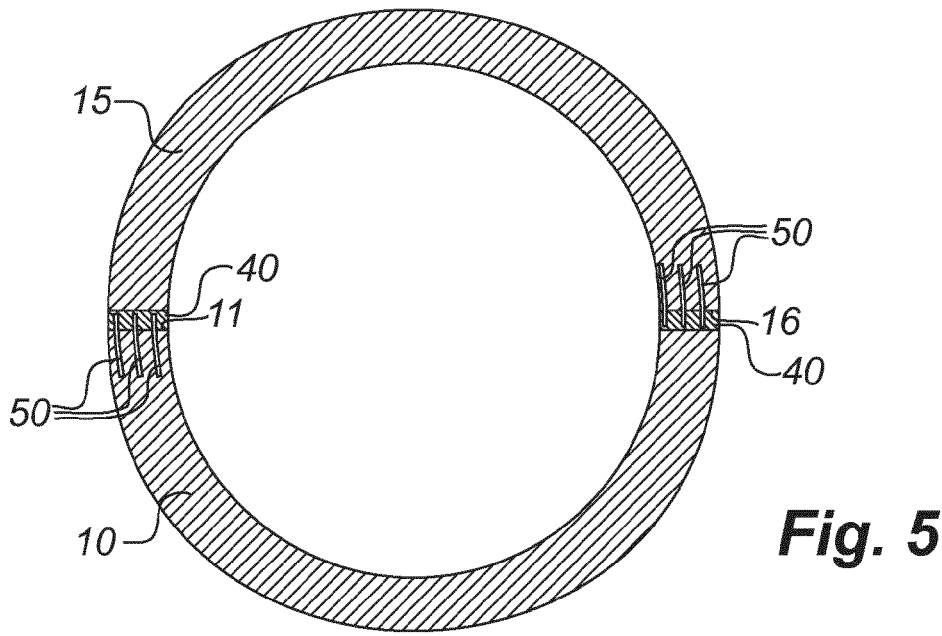
FIG. 5 shows part of a cross-sectional view of a second additional embodiment of a wind turbine according to the invention.
Figure 6:
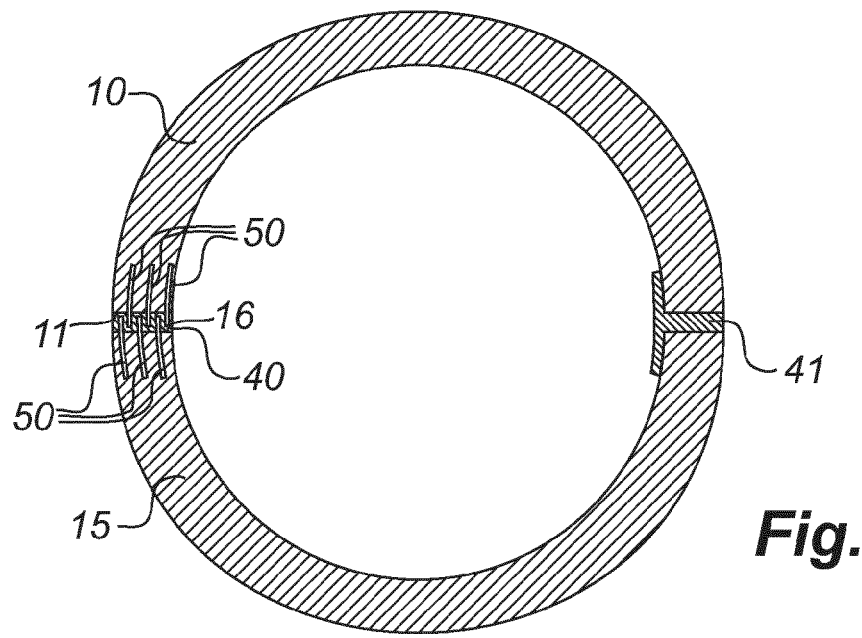
FIG. 6 shows part of a cross-sectional view of a third additional embodiment of a wind turbine according to the invention.

FIGS. 5 and 6 show a second and a third embodiment according to the invention, where a first shell part 10 and a second shell part 15 are bonded together in a bonding region between the first shell part 10 and the second shell part 15 by a curable bonding means 40. Preferably, the first shell part 10 and the second shell part 15 are formed in a fibre-reinforced polymer. The first shell part 10 comprises an end surface 11 facing an end surface 16 of the second shell part 15. The end surfaces face the bonding means 40 and are bonded thereto. The first and the second shell part 10, 15 further comprise a number of filaments 60 extending from the end surfaces 11, 16 into the bonding means 40 and being fastened to both the bonding means 40 and the respective shell part 10, 15 from which the filaments 60 extend.

Further, FIG. 6 discloses a modified bonding means 41 being essentially T-shaped and seen in a cross-sectional view, whereby flange portions of the bonding means are bonded to the respective inner surfaces of the first and second shell part 10, 15.

Figure 7:
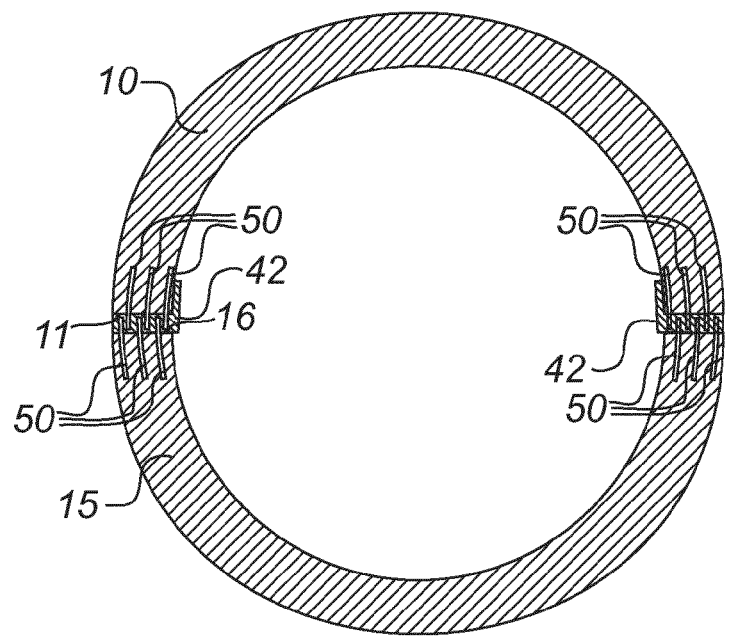
FIG. 7 shows part of a cross-sectional view of a fourth additional embodiment of a wind turbine according to the invention.

FIG. 7 shows a fourth embodiment according to the invention, where a first shell part 10 and a second shell part 15 are bonded together in a bonding region between the first shell part 10 and the second shell part 15 by a curable bonding means 42. The bonding means is essentially L-shaped as seen in a cross-sectional view, whereby a flange portion of the bonding means is bonded to an inner surface of the first shell part 10. Preferably, the first shell part 10 and the second shell part 15 are formed in a fibre-reinforced polymer. The first and the second shell part 10, 15 comprise an end surface 11, 16 facing and being bonded to the bonding means 42. The first and the second shell part 10, 15 further comprise a number of filaments 60 extending from the end surfaces 11, 16 into the bonding means 42 and being fastened to both the bonding means 42 and the respective shell part 10, 15 from which the filaments 60 extend.

It is clear from the previous description that the first and the second shell parts 10, 15 may form substantially the pressure side and the suction side of the blade, respectively (or an upper and lower blade shell that are glued together).

LIST OF REFERENCES

1 Blade root
2 Wind turbine blade
10 First shell part
11 End surface
15 Second shell part
16 End surface
23 Hub
24 Wind turbine
25 Nacelle
26 Root region
27 Airfoil region
28 Transition region
32 Blade tip
33 Trailing edge
34 Leading edge
36 Tower
40 Bonding means
41 Bonding means, T-shaped
42 Bonding means, L-shaped
50 Resistive heating means
60 Filaments

The invention claimed is:

1. A wind turbine blade (2) for a rotor having a substantially horizontal rotor shaft, the rotor comprising a hub (23) from which the wind turbine blade (2) extends substantially in a radial direction when mounted to the hub (23), the wind turbine blade (2) being made of a fibre-reinforced composite material comprising fibres embedded in a polymer matrix, the wind turbine blade (2) comprising:
 a profiled contour including a leading edge (34) and a trailing edge (33) as well as a pressure side and a suction side, the profiled contour generating a lift when being impacted by an incident airflow, wherein the profiled contour is divided into:
 a root region (26) with a substantially circular profile closest to the hub (23),
 an airfoil region (27) with a lift generating profile furthest away from the hub (23), and optionally
 a transition region (28) between the root region (26) and the airfoil region (27), a profile of the transition region (28) changing gradually in the radial direction from the substantially circular profile of the root region (26) to the lift generating profile of the airfoil region (27), wherein the profiled contour is formed by a first shell part (10) and a second shell part (15) being bonded together in a bonding region between the first (10) and the second shell part (15) by a curable bonding means (40), the first (10) and the second shell part (15) being formed in a fibre-reinforced polymer, characterised in that the wind turbine blade (2) further comprises resistive heating means (50) being arranged in thermal connection with the bonding means (40) such that the resistive heating means (50) supplies heat for curing of the curable bonding means (40) during assembling of the wind turbine blade (2); wherein the resistive heating means (50) become integrated in the wind turbine blade; and
wherein the resistive heating means (50) is embedded in and forms an integral part of the first shell part (10) and is arranged in the proximity of the bonding region.

2. The wind turbine blade (2) according to claim 1, wherein the resistive heating means (50) is embedded in and forms an integral part of the bonding means (40).

3. The wind turbine blade (2) according to claim 1, wherein the resistive heating means (50) is provided by at least one conductive wire (50).

4. The wind turbine blade (2) according to claim 3, wherein the at least one conductive wire is a metal wire, such as a steel wire.

5. The wind turbine blade (2) according to claim 1, wherein the bonding means (40) is fibre-reinforced.

6. The wind turbine blade (2) according to claim 1, wherein the bonding means (40) comprises curable material and resistive heating means (50).

7. The wind turbine blade (2) according to claim 1, wherein the resistive heating means (50) is provided by conductive fibres in the fibre-reinforcement.

8. The wind turbine blade (2) according to claim 7, wherein the conductive fibres in the fibre-reinforcement are metal fibres, such as steel fibres.

9. The wind turbine blade (2) according to claim 1, wherein the bonding means (40) comprises a flange for bonding to an inner surface of the first and/or second shell part (10, 15).

10. The wind turbine blade (2) according to claim 1, wherein the wind turbine blade (2) further comprises a number of filaments (60) extending from the end surface (11, 16) of either the first (10) and/or the second shell part (15) into the bonding means (40) and being bonded to both the bonding means (40) and the respective shell parts (10, 15) from which the filaments (60) extend.

11. The method for manufacturing a wind turbine blade (2) according to claim 1, wherein the method comprises the following steps:

a) providing a first (10) and a second shell part (15), bonding means (40) and resistive heating means (50), b) arranging the bonding means (40) between the first (10) and the second shell part (15) forming a bonding region, and c) activating the resistive heating means (50) in order to heat the bonding region, so that the bonding means (40) cures and thereby bonds the first (10) and the second shell part (15) together in the bonding region via the bonding means (40).

12. The method according to claim 11, wherein the method further comprises step:

e) connecting the resistive heating means (50) via wires to a power supply.

13. The method according to claim 11, wherein the activation of the resistive heating means (50) in step c) is provided by sending an electrical current through the resistive heating means (50).

14. The method according to claim 11, wherein the activation of the resistive heating means (50) in step c) is provided by inducing an electrical current in the resistive heating means (50) by use of magnetic means.

\* \* \* \* \*